United States Patent
Essiambre et al.

(10) Patent No.: US 6,606,176 B1
(45) Date of Patent: Aug. 12, 2003

(54) MODULATION FORMAT WITH LOW SENSITIVITY TO FIBER NONLINEARITY

(75) Inventors: Rene'-Jean Essiambre, Red Bank, NJ (US); Benny Mikkelsen, Atlantic Highlands, NJ (US); Gregory Raybon, Shrewsbury, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/372,486

(22) Filed: Aug. 12, 1999

Related U.S. Application Data

(60) Provisional application No. 60/121,477, filed on Feb. 24, 1999.

(51) Int. Cl.$^7$ ............................................... H04B 10/00
(52) U.S. Cl. ..................... 359/161; 359/184; 359/173
(58) Field of Search ................................. 359/123, 124, 359/173, 161, 154, 341, 180, 181, 184, 185, 186; 372/26, 25

(56) References Cited

U.S. PATENT DOCUMENTS

| | | | | |
|---|---|---|---|---|
| 5,574,590 A | * | 11/1996 | Edagawa et al. | ....... 359/161 X |
| 5,629,795 A | * | 5/1997 | Suzuki et al. | ........... 359/161 X |
| 5,642,215 A | * | 6/1997 | Suzuki et al. | ................. 359/161 |
| 5,898,714 A | * | 4/1999 | Morita et al. | .............. 372/25 X |
| 6,335,819 B1 | * | 1/2002 | Cho et al. | ................ 359/176 X |

OTHER PUBLICATIONS

Moodie et al, "Generation of 6.3 ps optical pulses at a 10 GHz repetition rate using a packaged electroabsorption modulator and dispersion compensating fibre", Electronics Letters, vol. 30, No. 20, pp. 1700–1701, Sep. 1994.*

* cited by examiner

*Primary Examiner*—Thomas Mullen
(74) *Attorney, Agent, or Firm*—Cohen, Pontani, Lieberman & Pavane

(57) ABSTRACT

A method for modulating fiber optic transmissions with a low sensitivity to fiber non-linearity utilizes short pulses (typically shorter than 20 ps), and bit rates of 10 Gb/s and higher, to improve performance relative to heretofore known nonlinear transmission with Return-to-Zero (RZ) format implementations. At a base bit rate of 40 Gb/s, a distance determination for achieving 100% cumulative dispersion compensation is made, and a predetermined amount of pre-dispersion compensation is applied based on a determined distance using lower duty cycles for transmission. Higher bit rates (i.e., higher than 40 Gb/s) broaden the spectral bandwidth of the transmission and can result in no pre-dispersion compensation or negative distance pre-dispersion compensation of the same sign as the transmission fiber.

7 Claims, 16 Drawing Sheets

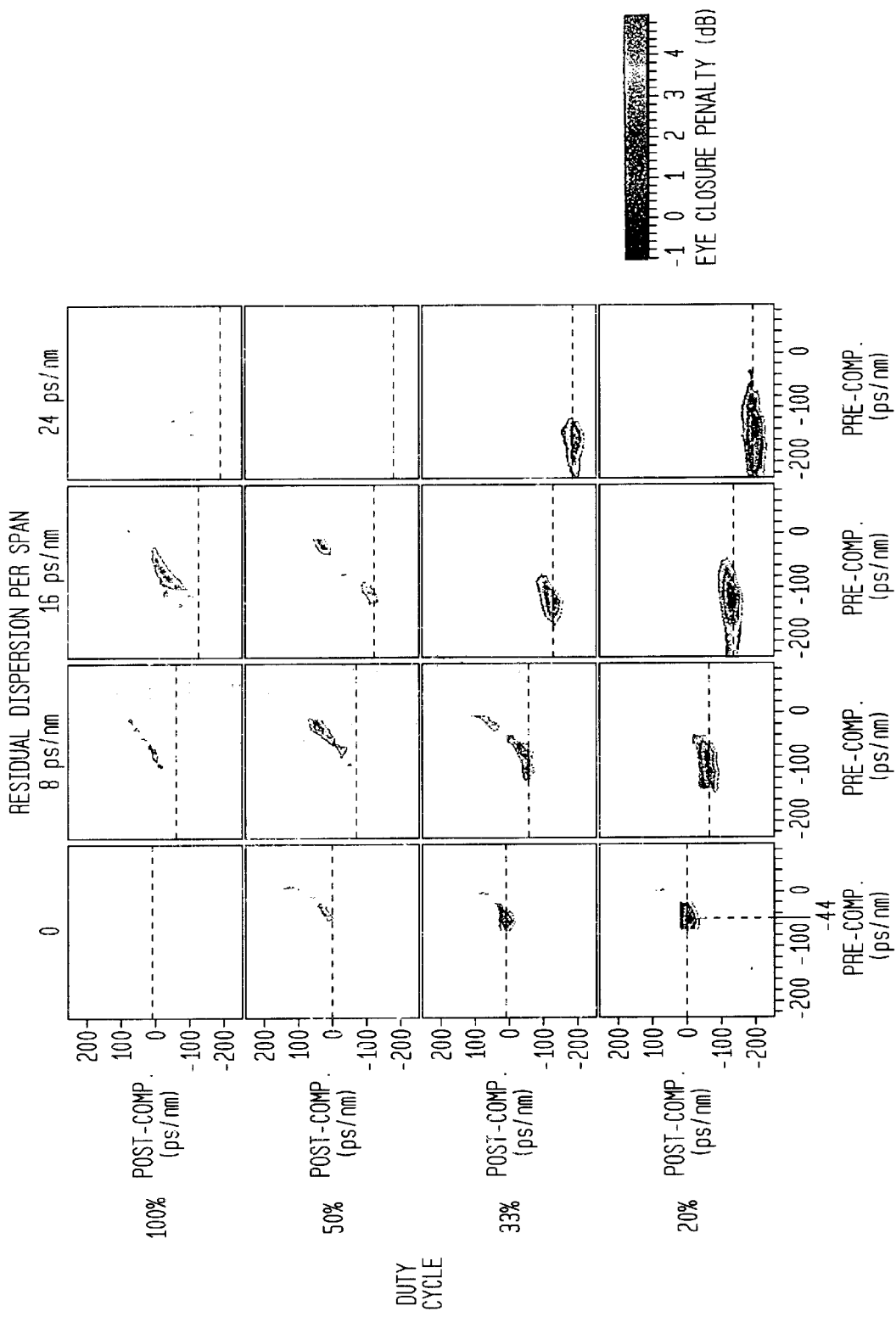

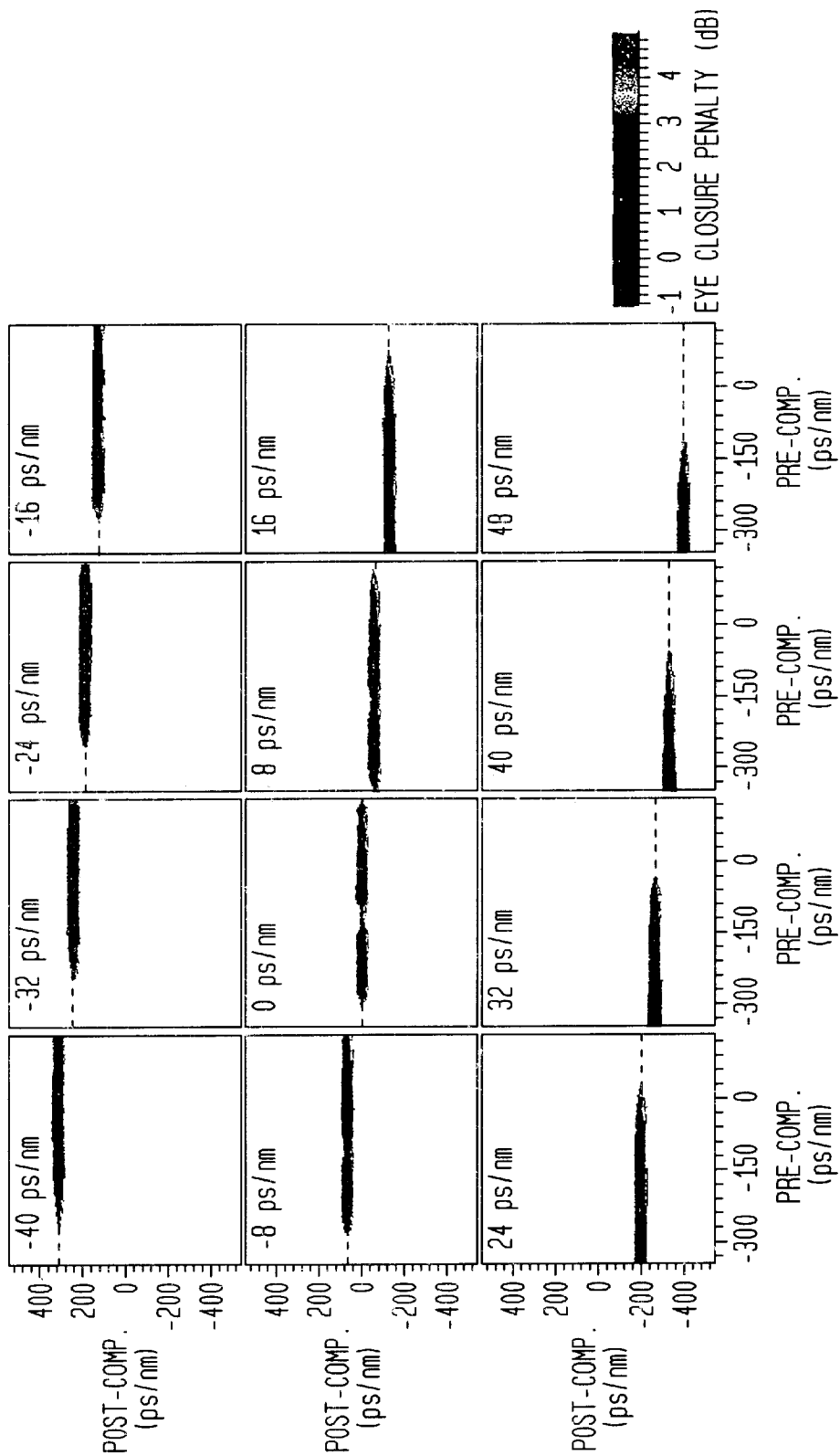

MODULATION FORMAT WITH LOW SENSITIVITY TO FIBER NONLINEARITY

PRIORITY INFORMATION

This application claims priority on the U.S. Provisional Application Ser. No. 60/121,477 filed on Feb. 24, 1999.

BACKGROUND OF THE INVENTION

1. Field of the Invention

The present invention relates to fiber optic communication transmission, and more particularly to a modulation format for fiber optic transmission having a low sensitivity to fiber non-linearity.

2. Description of the Related Art

Since the advent of fiber amplifiers (i.e. fiber optic line amplifiers), there has been an ongoing debate regarding the role of time-division-multiplexing (TDM) versus wavelength-division-multiplexing (WDM). Soon after the discovery of fiber amplifiers it became obvious that TDM alone would not be suitable to exploit the full amplifier bandwidth as it would require the use of femtosecond pulses. Thus, a mixture of TDM and WDM would be required. However, the question of which base bit rate to use for WDM still remained. There are many reasons to promote or reject the use of higher base bit rates. An argument against high-bit-rate based systems is that non-linear transmission is, particularly difficult and, in general, the technology has not matured to that level. With low-bit-rate based systems, one quickly realizes that the number of components (transmitters, receivers, add/drop (de-) multiplexers, etc.) increases to an unacceptable level, especially for future wide-band high-capacity systems. In the long run, however, with ever improving technologies, the most relevant consideration when choosing a bit rate may be related to the spectral efficiency associated with the base bit rate.

The spectral efficiency is dependent on system parameters such as the distance of the transmission, the type of optical fiber used and the amplifier spacing. The spectral efficiency is defined as the bit rate density in the spectral domain. Early WDM systems were based on 2.5 Gb/s channels spaced by 100 GHz. The spectral efficiency of such systems is 0.025 bits/Hz. For intensity-modulated formats, the ultimate spectral efficiency (in the absence of any propagation) can be estimated from the spectral overlap of adjacent channels. For Non Return-to-Zero Modulation (NRZ), spectral overlap limits the spectral efficiency to a value around 1 bit/Hz. This indicates that early WDM systems are far from close to the limit imposed by spectral overlap. The spectral efficiency of 2.5 Gb/s channels can be increased to 0.05 bits/Hz by adjusting the channel spacing to 50 GHz. Reducing the channel spacing, however, generally leads to increased power penalties after transmission from nonlinear interactions between channels.

The two main non-linear interactions specific to WDM systems are four-wave mixing (FWM) and cross-phase modulation (XPM). In 2.5 Gb/s systems, one can double the spectral efficiency to obtain 0.1 bits/Hz by using a higher base bit rate of 10 Gb/s with 100 GHz channel spacing. For such spacing, nonlinear WDM interactions, in general, do not dramatically affect the transmission. Going to higher bit rates generally allows dramatic reduction of nonlinear WDM interactions but makes single-channel transmission increasingly difficult (i.e. transmission of a single channel in the absence of any other channel). For instance, while no dispersion compensation is required for single-channel transmission at 2.5 Gb/s, transmission of a 10 Gb/s signal over terrestrial system distances (i.e. distances up to about 640 km) requires careful and difficult to maintain dispersion compensation mapping accurate to a few hundredths of ps/nm at the end of the transmission line.

As mentioned above, nonlinear transmission at high bit rates (e.g. >10 Gb/s and more) is not limited by nonlinear interaction of WDM systems (many channels with different wavelength) as is the case for lower bit rates (i.e. <10 Gb/s); the limitations are instead due to single channel effects. There are two types of single channel effects. The first type of single channel effect is the isolated pulse transmission (solitons are an example of a format designed around having the best isolated pulse transmission, whereas the second type of single channel effect is pulse-to-pulse interactions. Pulse-to-pulse interactions originate from the overlap between neighboring pulses after they have experienced some dispersion.

The use of pulses to counteract fiber non-linearity is an idea widely known and the concept of solitons and dispersion-compensated solitons (also known as dispersion-managed solitons, or DMS) has been applied in this context. It should be noted, that for solitons and DMSs, one attempts to reduce pulse spreading to minimize the overlap between adjacent pulses of the same channels.

In the effort to improve spectral efficiency, it becomes important to study bit rates exceeding 10 Gb/s. Specifically, and by way of example, 40 Gb/s is an important bit rate to consider, since by conventions of optical standards (i.e. SONET and SDH), 40 Gb/s is the next standard bit rate beyond 10 Gb/s.

SUMMARY OF THE INVENTION

The present invention provides a method for modulating fiber optic transmissions with low sensitivity to fiber non-linearity. The modulation format of the present invention uses either pulses shorter than those of solitons or DMSs, or uses a pulse width similar to solitons or DMSs but allows the pulses to spread well beyond what is considered soliton or DMS propagation. In addition, the modulation format takes advantage of spreading between adjacent pulses to average out nonlinear interactions between pulses.

In accordance with an embodiment of the present invention, the method utilizes short pulses (typically shorter than 20 ps) with broad spectral bandwidth, and bit rates of 10 Gb/s and higher to improve performance over heretofore studied and used nonlinear transmission with Return-to-Zero (RZ) format. The operable range for the short pulses can be as low as 0.004 ps up to 20 ps.

In another embodiment, pre- and/or post-dispersion compensation can be added to the transmission to further improve performance. Increasing of the bit rate above 40 Gb/s results in a broader spectral bandwidth which provides effects comparable to using shorter pulses at lower bit rates without requiring pre-dispersion compensation. For example, bit rates in excess of 100 Gb/s inherently have broader spectral bandwidth which also reduces the effect of non linearity in transmission, and may not require using very short pulses.

In one embodiment at which the base bit rate is 40 Gb/s, the modulation method of the present invention includes the steps of pre-dispersion compensating of the transmission information, transmitting the information through the fiber, and post-dispersion compensating the transmission information to obtain 100% cumulative compensation at the end of the transmission fiber.

The present invention is described, inter alia, in the form of a systematic study of nonlinear transmission of a single 40 Gb/s channel. It is observed that from the perspective of nonlinear single-channel transmission at 40 Gb/s, the NRZ format does not provide the optimum system performance. Although not optimum, NRZ format may, nonetheless, also be used. When transmitting at 40 Gb/s, significantly improved nonlinear transmission can be achieved by using the Return-to-Zero (RZ) format with a low duty cycle (e.g. ~20%). The advantages obtained through use of a format with a low duty cycle increase with the dispersion of the transmission fiber.

When transmitting at 40 Gb/s, the step of pre-dispersion compensation is performed based on the average position of the point of zero cumulative dispersion inside each transmission fiber. The average point of zero cumulative dispersion is a distance at which the amount of pre-compensation is adjusted to provide accurate reconstruction of the transmitted signal at the receiving end. This average point of zero cumulative dispersion for a base bit rate of 40 Gb/s has been determined to be within a 0 km–20 km span of the transmission fiber. This distance range corresponds to roughly the effective length (length of fibers having 70% power loss) of the transmission fiber.

It is important to note that as the base bit rate is increased (i.e. above the 40 Gb/s shown here), thereby broadening the spectral bandwidth of the signal, the range for the average point of zero cumulative dispersion will increase and can result in a distance of 0 km or less indicating that no pre-dispersion compensation or even negative distance pre-compensation of the same sign as the transmission fiber is required.

The modulation technique described herein is not limited to format transmission and can be applied to any coherent digital or analog signal transmission having a broad bandwidth for transmitting and carrying information. Stated differently, the modulation technique applies to all signals for which the nonlinear length (i.e. length over which the signal phase distorted by the fiber non-linearity) at high power becomes shorter than the dispersion length (i.e. the length over which one sees significant signal evolution from dispersion).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements through the several views:

FIG. 5a is a graphical representation of the system performance for TrueWave™ family of fibers for 12 dBm of signal input average power;

FIG. 7b is a graphical representation of the system performance for systems based on standard un-shifted fibers at 20% duty cycle for 12 dBm of signal input average power;

DETAILED DESCRIPTION OF THE PRESENTLY PREFERRED EMBODIMENTS

The present invention is described by way of example using a terrestrial system consisting of 8 spans of 80 km each. The exemplary system herein is considered one of the most challenging from the point of view of nonlinear transmission for terrestrial systems. An experimental regime is presented that uses various 40 Gb/s transmission and above fiber types. Other fibers may similarly be used or incorporated, taking into consideration their respective characteristics. Two input average power levels of 8 and 12 dBm are considered by way of the illustrative example, for the system.

For 8 spans of 80 km, the nominal input-signal average power of a 10 Gb/s channel of commercial systems is 9.5 dBm. Thus, to provide 40 Gb/s would require an increase of 6 dB of the average power per channel (i.e. 6 dB of the Signal-to-Noise Ratio (SNR)). The higher power requirement at 40 Gb/s originates from the need to preserve the energy per bit to ensure error-free detection. The nominal signal input average power per channel at 40 Gb/s would therefore be 15.5 dBm per channel. However, amplifier gain ripples will create a spread in powers of the WDM channels as they propagate; typical gain ripples are 1 dB peak to peak. Since gain ripples are generally correlated from amplifier to amplifier, some channels will acquire as much as 4 dB more power at the end of 8 spans relative to the input power. Inasmuch as the high power channels are the primary concern, the effect of increased non-linearity in transmission from gain ripples may be simulated by increasing the input power in the simulations by 2 to 3 dB (power levels per channel at the input of each span are kept constant in the simulations). To simulate the effective non-linearity of the worst (highest power) channels at 40 Gb/s with 15.5 dBm nominal input power, therefore, one should use about 18 dBm.

Commercial systems have a built-in SNR margin of about 6 dB which means that the minimum input power per channel that would provide the minimum SNR for detection is around 9.5 dBm at 40 Gb/s (i.e. 12 dBm in the simulations). The simulations herein described are thus around the limit of the minimum SNR for error-free detection. It is important to note that the results presented can also be interpolated for shorter systems, which have lower power requirements as the noise level is lowered for a reduced number of amplifiers, or for amplifiers with reduced gain in systems with short spans. For many such systems, 12 dBm of input-signal average power may be sufficient to fulfill the SNR specifications for that particular system.

Figure 1:
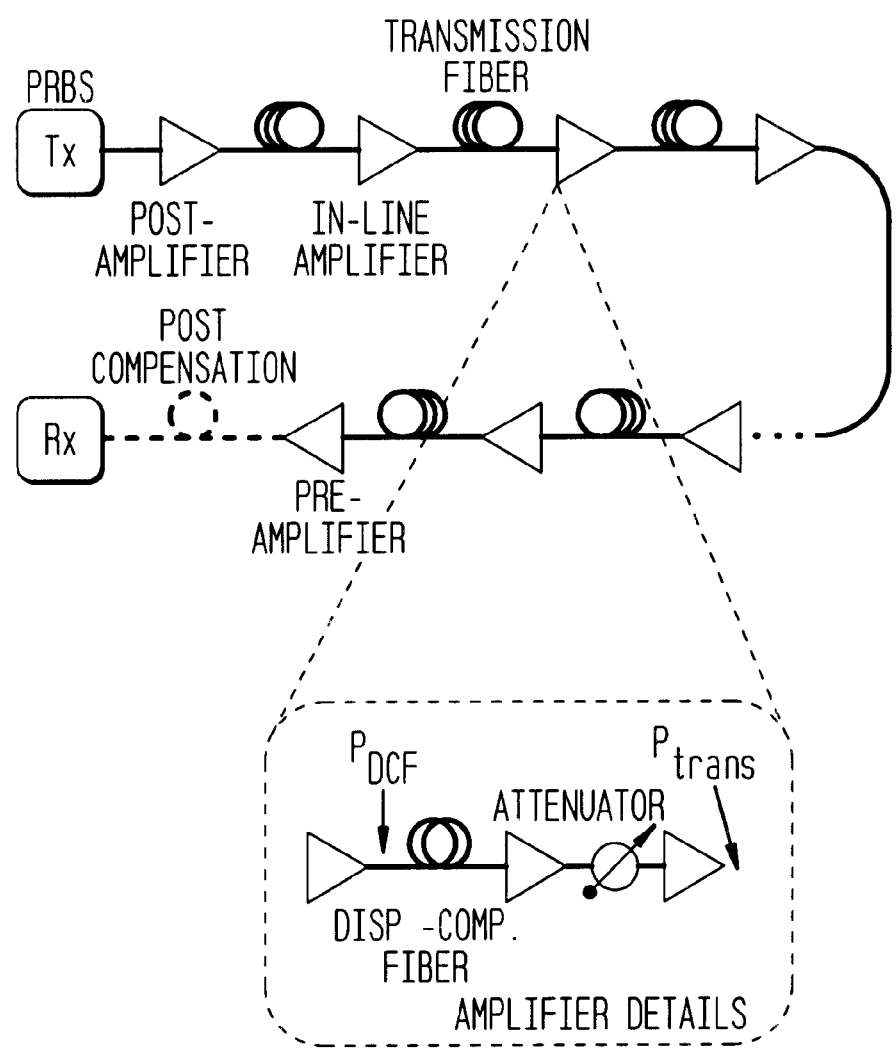
FIG. 1 is a system schematic representation of a fiber optic transmission line according to the present invention.
Figure 2:
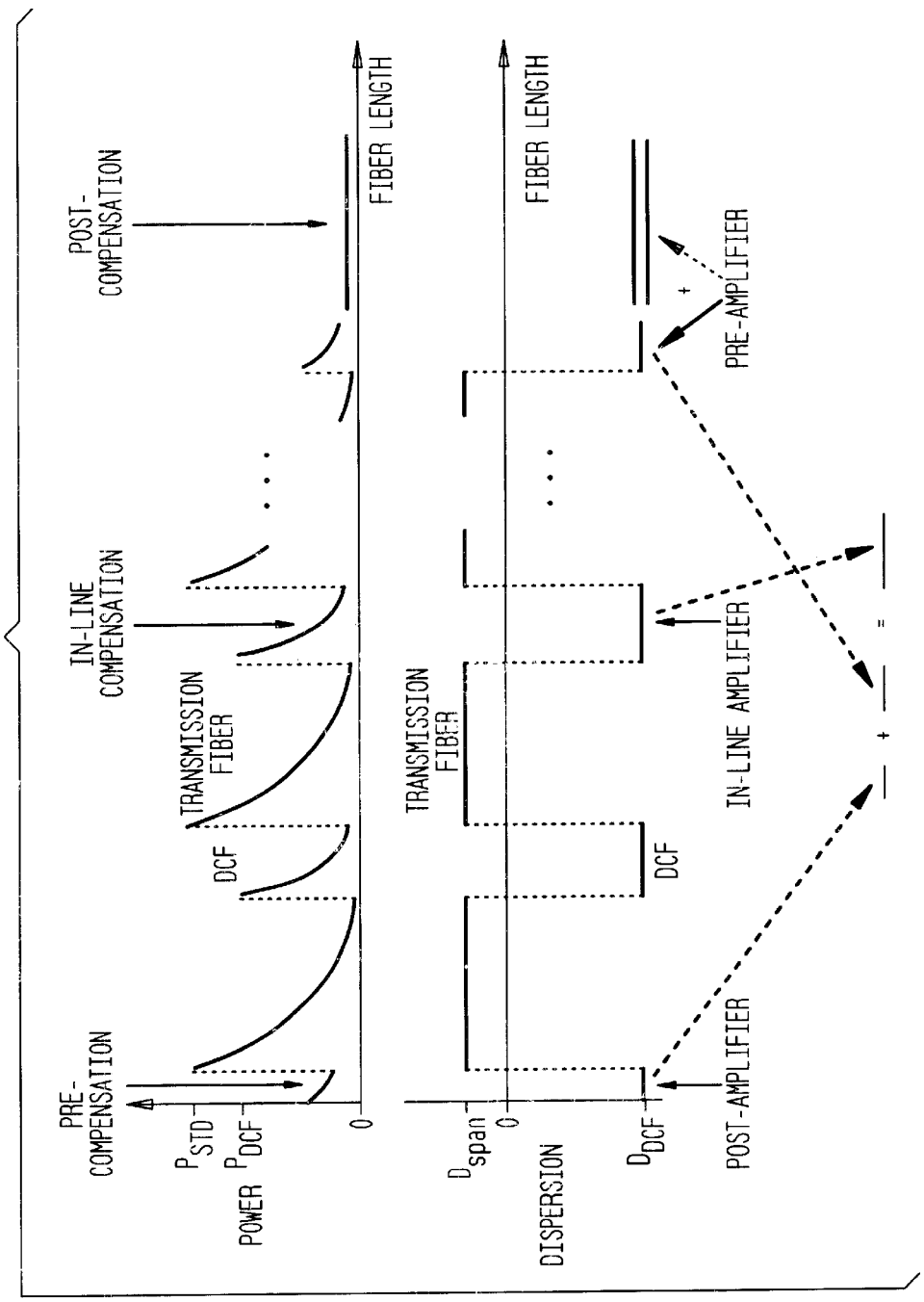
FIG. 2 is a graphical schematic of power and dispersion maps according to the present invention.

Referring now to FIGS. 1 and 2, a pseudo-random bit sequence (PRBS) is transmitted via the transmission fiber. The pre-compensation (i.e. pre-dispersion compensation) for the transmission is performed in the post amplifier (FIG. 1). As shown in FIG. 2, the dispersion compensation in the post amplifier is carried out at $D_{DCF}$ which is a fixed standard value of about -85 ps/(km nm). $D_{DCF}$ is the dispersion factor for dispersion compensating fiber (DCF) and is generally 5 times the standard dispersion compensation which is 17 ps/(km nm), thus yielding 85 ps/(km nm) with the negative sense indicating compensation. Once the transmission enters the transmission fiber; the dispersion is $D_{span}$, and the power jumps up to $P_{STD}$ which is the standard power for transmission. As the fiber length increases, the power drops or degrades as shown. When the transmission reaches an in-line amplifier (FIG. 1), the dispersion is compensated back down to $D_{DCF}$ which results in the power being amplified to $P_{DCF}$, the power for the dispersion compensated fiber (DCF). The in-line amplifier generally performs at close to 100% compensation for the transmission; the present invention, on the other hand, applies to all in-line compensation including well above or below 100%. This cycle continues for each span until the end of the combined transmission span. As shown in FIG. 2, as the length of the fiber increases, more dispersion compensation is required.

In FIG. 2, non-linearity in dispersion-compensating fibers (DCFs) is neglected to simplify the analysis. Pre-dispersion compensation is applied in the post amplifier to alter the format prior to entering the high power section of the transmission line. As the level of pre-compensation is varied by increasing the length of DCF in the post amplifier, one correspondingly shortens the DCF in the pre-amplifier at the end of the transmission line in order to preserve the cumulative level of dispersion compensation in the system. Differences in system performance for different levels of pre-compensation therefore originate solely from fiber non-linearity. Additionally, post-transmission compensation is applied to bring the signal back to an optimal value of dispersion for which the eye opening is maximized. Various levels of in-line dispersion compensation have been considered herein to simulate the effect that incomplete dispersion slope compensation by the DCFs has on channels at various locations in the amplifier band.

Figure 3:
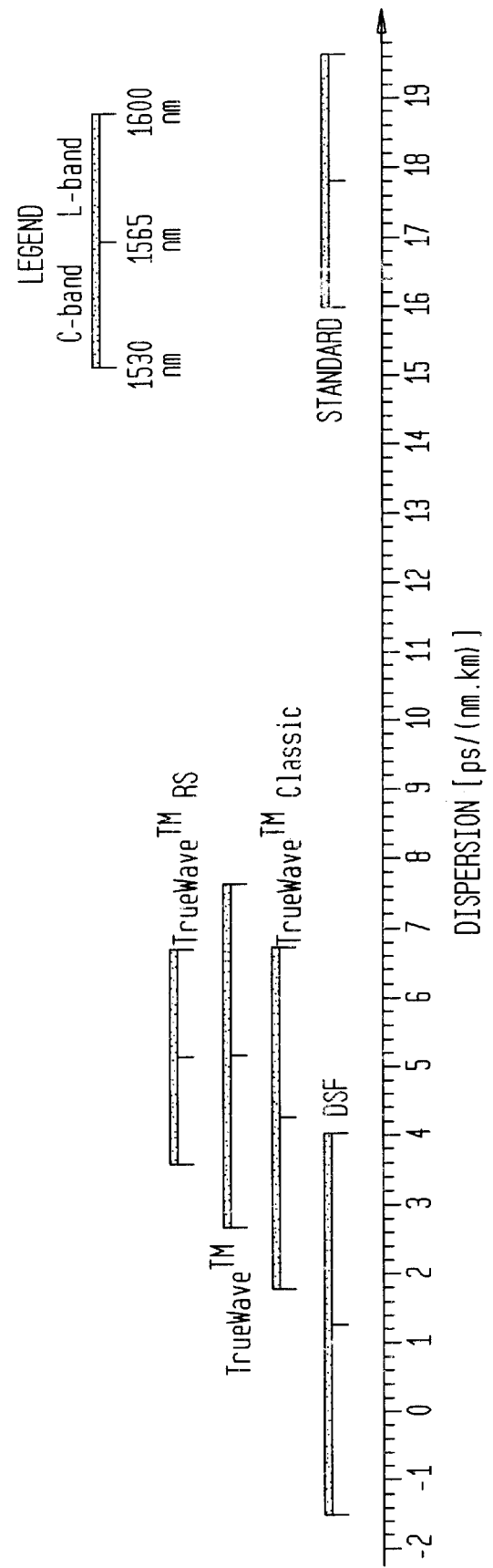
FIG. 3 is a line representation of the range of dispersion in the 1530–1600 nm window for various types of optical fibers.

FIG. 3 displays the approximate dispersion characteristics of the various transmission fibers commercially distributed under the names TrueWave™ RS, TrueWave™, True-Wave™ Classic, Dispersion Shifted Fiber (DSF) and Standard and that are offered, for example, by Lucent Technologies, Inc. Each line in FIG. 3 represents the range of dispersion of a given fiber in the 1530–1600 nm band. The dispersion of the DCF used in the calculations is -85 ps/(nm km) at 1550 nm with a dispersion slope of -0.35 ps/(nm² km) which corresponds to the DCF with the highest slope in fiber manufactured by Lucent Technologies Inc. Such DCF allows simultaneous, nearly complete, dispersion and dispersion slope compensation of standard (STD) un-shifted fibers. However, DCFs in general incompletely compensate the dispersion slope of fibers other than STD fibers.

System performance is measured by the eye closure penalty (expressed in dB) at the end of the transmission line. The reference for the eye closure penalty is the eye opening of an NRZ signal filtered by an electrical Bessel filter of bandwidth equal to 70% of the bit rate. A system is generally considered as having unacceptable performance if the eye closure penalty exceeds 2 dB.

The large parameter space within which optimum system performance is sought suggests the use of multi-dimensional visualization. This is performed by first plotting the eye closure penalty using to a color code in the bi-dimensional space of dispersion pre-compensation and post-compensation. For purposes of this disclosure, the color code is represented by a gray scale. This method of displaying the results has the advantage of not only providing the optimum operation point in the pre- and post-compensation space, but additionally depicting the tolerance in both pre- and post-dispersion compensation for acceptable system performance. The next step is to arrange a sequence of these bi-dimensional plots in an array in which each row represents a given value of duty cycle and each column a value of residual dispersion per span. The duty cycle is the ratio of the pulse duration to the bit period. The residual dispersion per span describes how much dispersion is left after in-line dispersion compensation has been applied. A residual dispersion of 0 ps/nm represents a fully dispersion-compensated channel, while a channel having a residual dispersion of 8 ps/nm per span will be under-compensated by 64 ps/nm after transmission over 8 spans. As illustrated in FIG. 2, we can recover from under-compensation of in-line dispersion by post-transmission dispersion compensation in the pre-amplifier (FIG. 1). To recover 64 ps/nm of in-line under-compensation one would apply -64 ps/nm of post-transmission compensation. This brings the net cumulative dispersion of the system to zero.

FIGS. 4 to 7 present the system performance for 12 dBm of signal input average power. Each figure represents typical parameter values for different fibers. Dispersion values can be associated with fibers as shown in FIG. 3. All of the fibers of FIG. 3 have effective core areas $A_{eff}$ of about 55 $\mu m^2$, except for the standard fiber for which has $A_{eff}$=80 $\mu m^2$; this difference in effective area for standard fiber is included explicitly in the calculations. Another difference between the fibers is their values of dispersion slope. The values of dispersion slopes used for each value of dispersion are shown in FIGS. 4 to 7 and correspond to a typical or highest value for each given fiber type. For the single-channel transmission examples considered herein, the dispersion slope primarily affects transmission by producing asymmetric pulse distortions; even though present, these distortions do not lead to dramatic penalties for the system parameters and distances herein considered. The impact of the dispersion slope, however, becomes more dramatic for WDM systems. After having applied dispersion compensation, a residual dispersion slope might remain if the DCFs do not completely compensate for the dispersion slope of the transmission fiber. As a result, channels at different wavelengths will experience different levels of dispersion compensation which will modify the nonlinear propagation dynamics. This is the reason for considering different levels of in-line dispersion compensation as presented in the figures. As a reference, the dashed line in each plot represents the level of post-transmission compensation required to make the net cumulative dispersion zero (i.e. full dispersion compensation).

Figure 4:
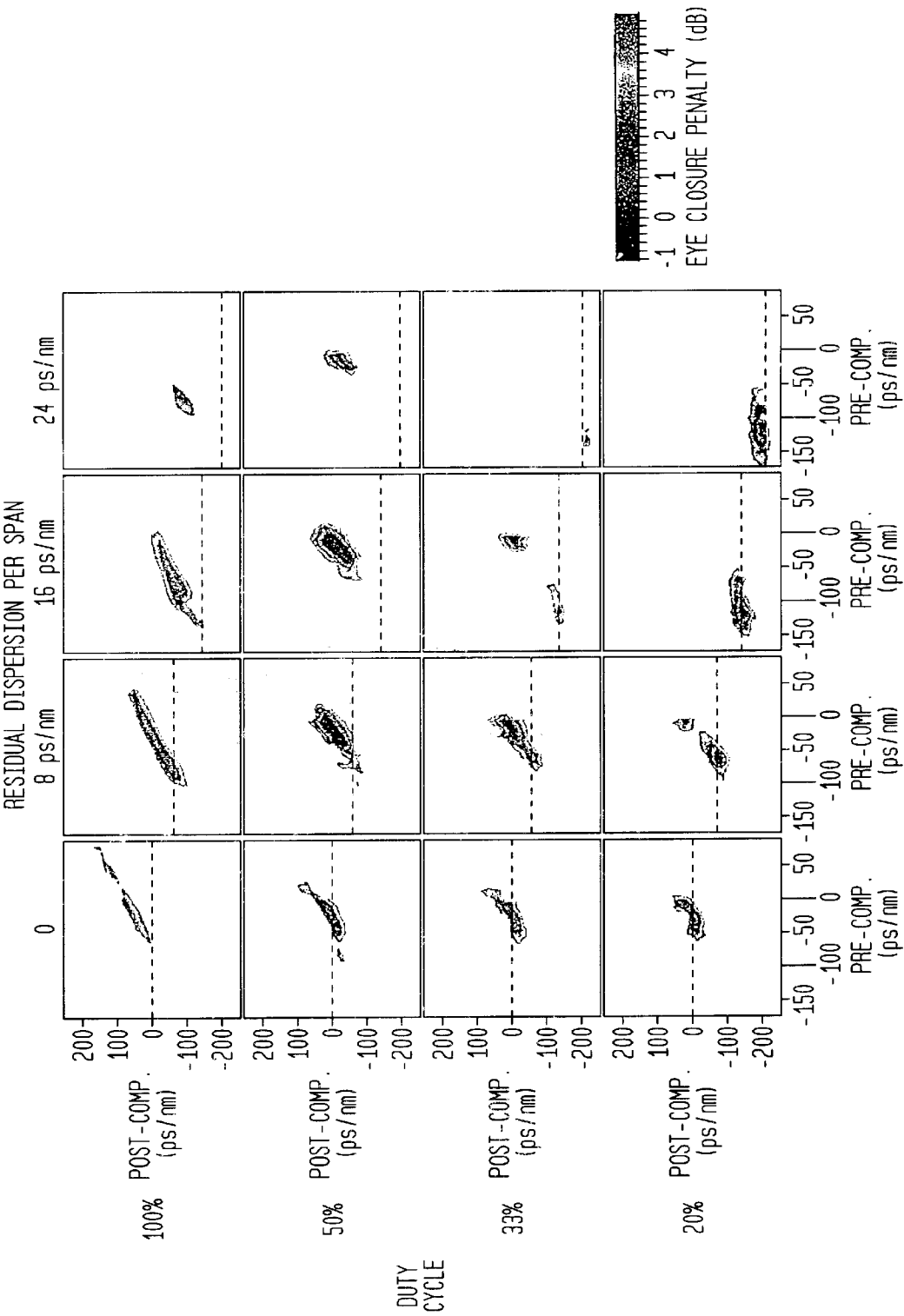
FIG. 4 is a graphical representation of the system performance for TrueWave™ DSFs using 12 dBm of signal input average power.

FIG. 4 shows the system performance for a TrueWave™ or a dispersion-shifted fiber (DSF) type of fiber. The indicated dispersion value D of 2 ps/(km nm) corresponds to a dispersion value in the short-wavelength side of a C-band amplifier for TrueWave™ and TrueWave™ classic fiber. It also corresponds to the dispersion of DSFs within the L-band amplifier band. As seen the best performance in terms of largest margin of dispersion is achieved for a duty cycle of 50%. The NRZ format (i.e. 100% duty cycle) does not perform particularly well as the eye closure penalty never drops below ~1.5 dB. However, it should be noted that part of the improvement in performance for the Return-to-Zero (RZ) format originates from a 2 dB improvement in receiver sensitivity for the RZ format relative to NRZ (the reference eye closure penalty for all formats is the filtered NRZ signal). As the duty cycle is decreased, it is clear that the optimum performance is achieved if some pre-compensation (i.e. pre-dispersion compensation) is applied before entering the first span. Optimum performance is represented by the darker center areas. The optimal level of pre-compensation (i.e. the amount of pre-compensation required for optimum performance) increases as the system becomes increasingly under-compensated (i.e. as the residual dispersion per span increases). Another important feature related to formats having a low duty cycle is that the optimum performance is reached when one applies 100% cumulative dispersion compensation over a wide range of in-line dispersion compensation. The inline dispersion compensation is represented by the residual dispersion per span. Thus, with a low duty cycle of 20%, 100% cumulative dispersion compensation can be achieved by varying the in-line dispersion compensation (i.e. 0, 8, 16, and 24 ps/nm). This is shown in that the dark areas in each plot are situated on and around the dashed line representing 100% cumulative dispersion compensation. The 33% and 50% duty cycles cannot provide 100% cumulative dispersion compensation as the in-line dispersion compensation (i.e. residual dispersion per span) increases.

The performance of the TrueWave™ family fibers with dispersion of D=4 ps/(km nm) is presented in FIG. 5a. As compared to fibers having a dispersion of D=2 ps/(km nm), there is a degradation of performance for the NRZ format and large duty cycle formats in general. On the other hand, performance of low duty cycle formats seems to be enhanced. Interestingly, the level of dispersion pre-compensation for optimum performance for low duty cycles for the fibers represented in both FIGS. 4 and 5 are very similar. This suggests that the optimum level of pre-compensation is mostly related to the level of in-line dispersion compensation (i.e. residual dispersion per span) rather than the dispersion value D of the transmission fiber itself. This observation is confirmed by looking at FIG. 6 which shows the system performance for TrueWave™-alike fibers with a higher dispersion value of D=8 ps/(km nm). TrueWave™-alike are generally non-zero dispersion fibers. It should be pointed out that the results of FIG. 6 also apply to the All-Wave™ fiber at about 1400 nm; however, since the nonlinear coefficient of All-Wave™ fiber is lower by about 1.6 dB relative to TrueWave™-alike fibers, the results of FIG. 6 apply to All-Wave™ fiber using 13.6 dBm of average power instead of 12 dBm as shown for TrueWave™-alike fibers. These optimum levels of dispersion pre-compensation in FIG. 6 are achieved at the lower duty cycles and are similar to those observed for other fiber types. Moreover, the phenomenon of degradation of performance for NRZ and large duty cycle formats seen when going from 2 to 4 ps/(km nm) fiber dispersion continues to be observed as we move from 4 to 8 ps/(km nm). The degradation for NRZ is such that the eye closure penalty is always above 5 dB.

Figure 5B:
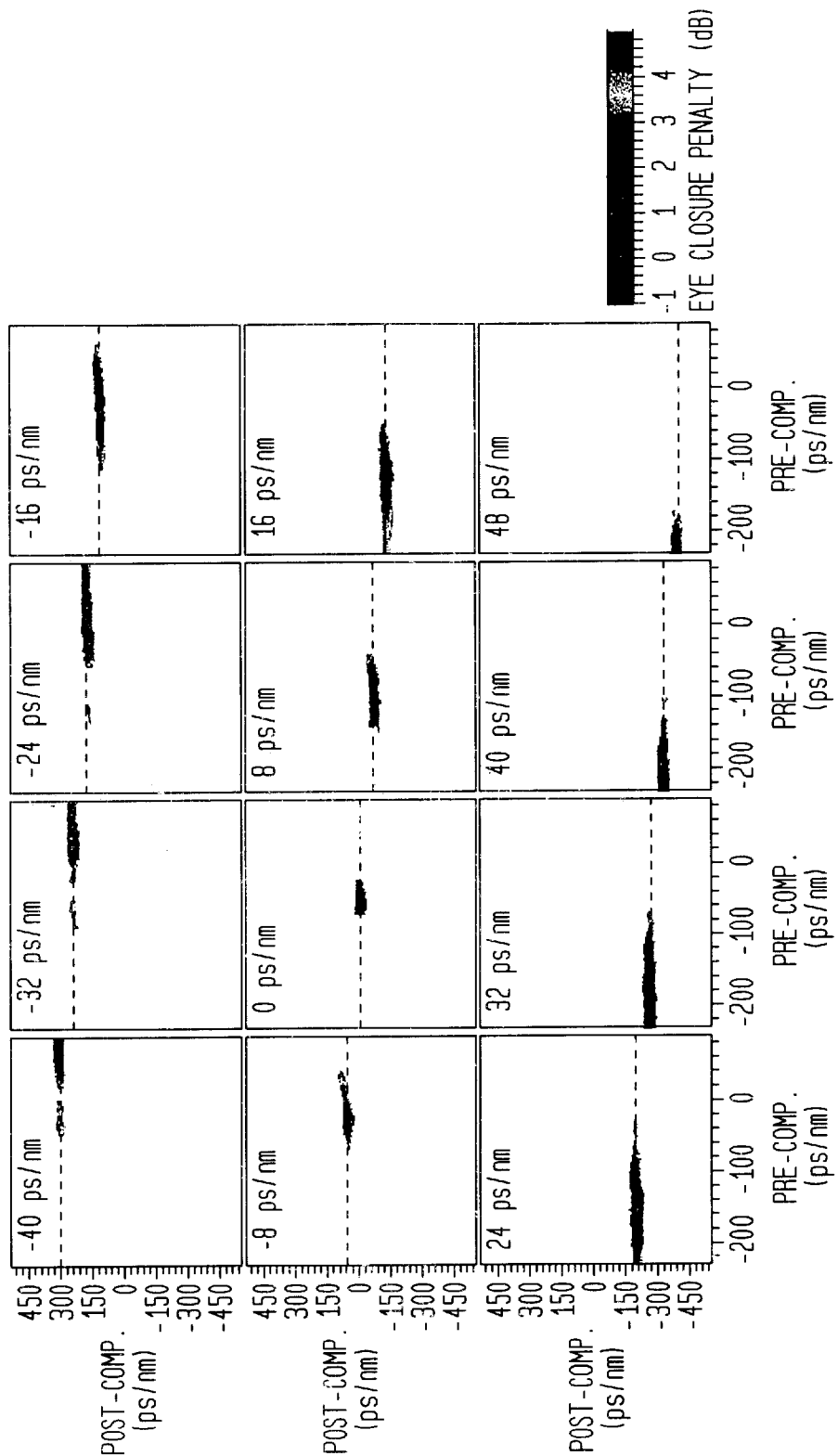
FIG. 5b is a graphical representation of the system performance for TrueWave™ family of fibers at 20% duty cycle for 12 dBm of signal input average power.
Figure 6:
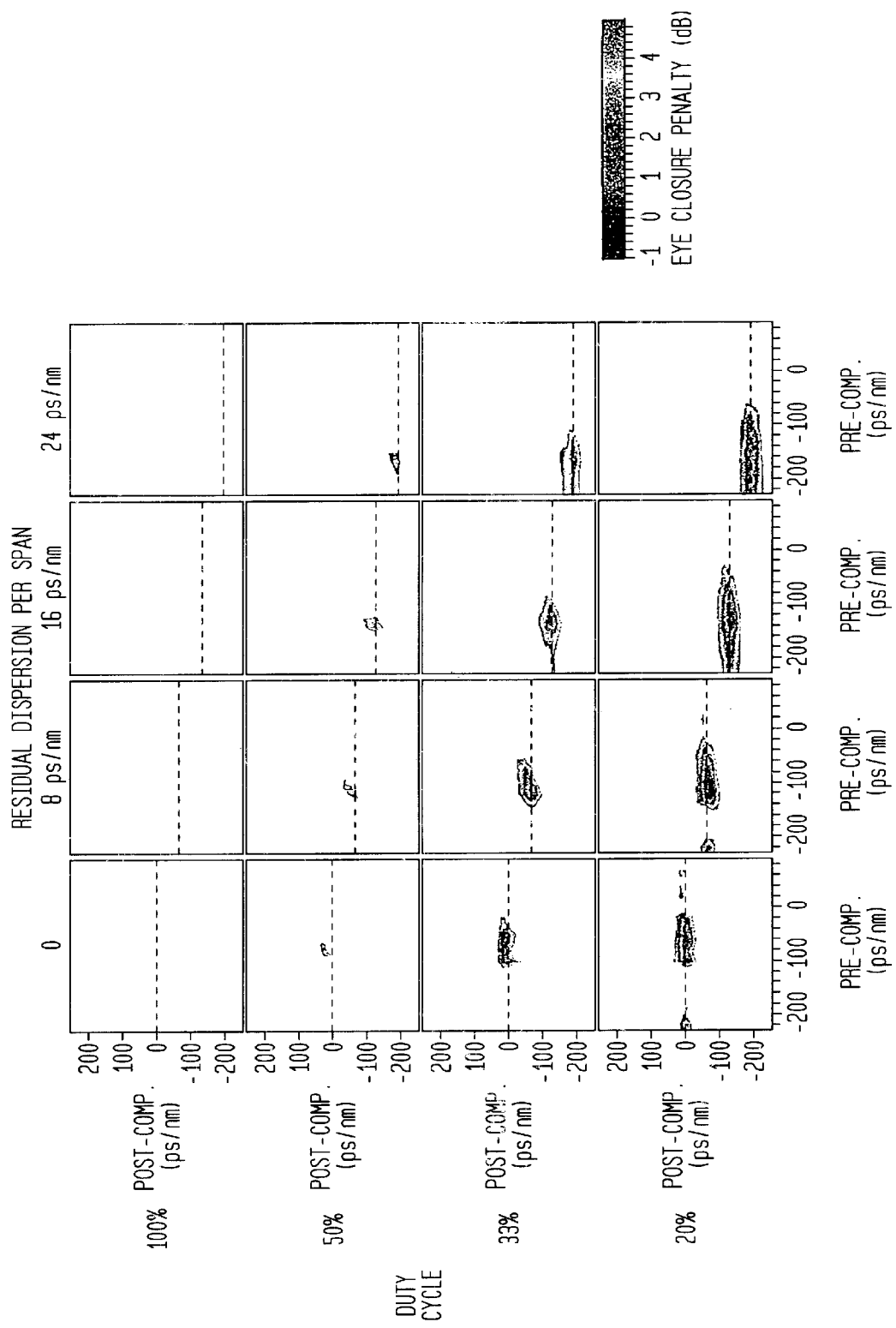
FIG. 6 is a graphical representation of the system performance for the long-wavelength amplifier side for TrueWave™ alike fibers for 12 dBm of signal input average power.

FIG. 5b presents the performance of the TrueWave™ family fibers with dispersion of D=4 ps/(km nm) for a 20% duty cycle and a varying residual dispersion span. As can be seen, the 20% duty cycle provides superior results in the eye closure penalty for varying residual dispersion per span values of −40 ps/nm to 48 ps/nm. Thus, in each case, pre-compensation of the transmission in the corresponding amount enables 100% cumulative dispersion compensation for each over-compensated residual dispersion (i.e. −40 ps/nm to −8 ps/nm), and also for each under-compensated residual dispersion (i.e., 8 ps/nm to 48 ps/nm).

Figure 7A:
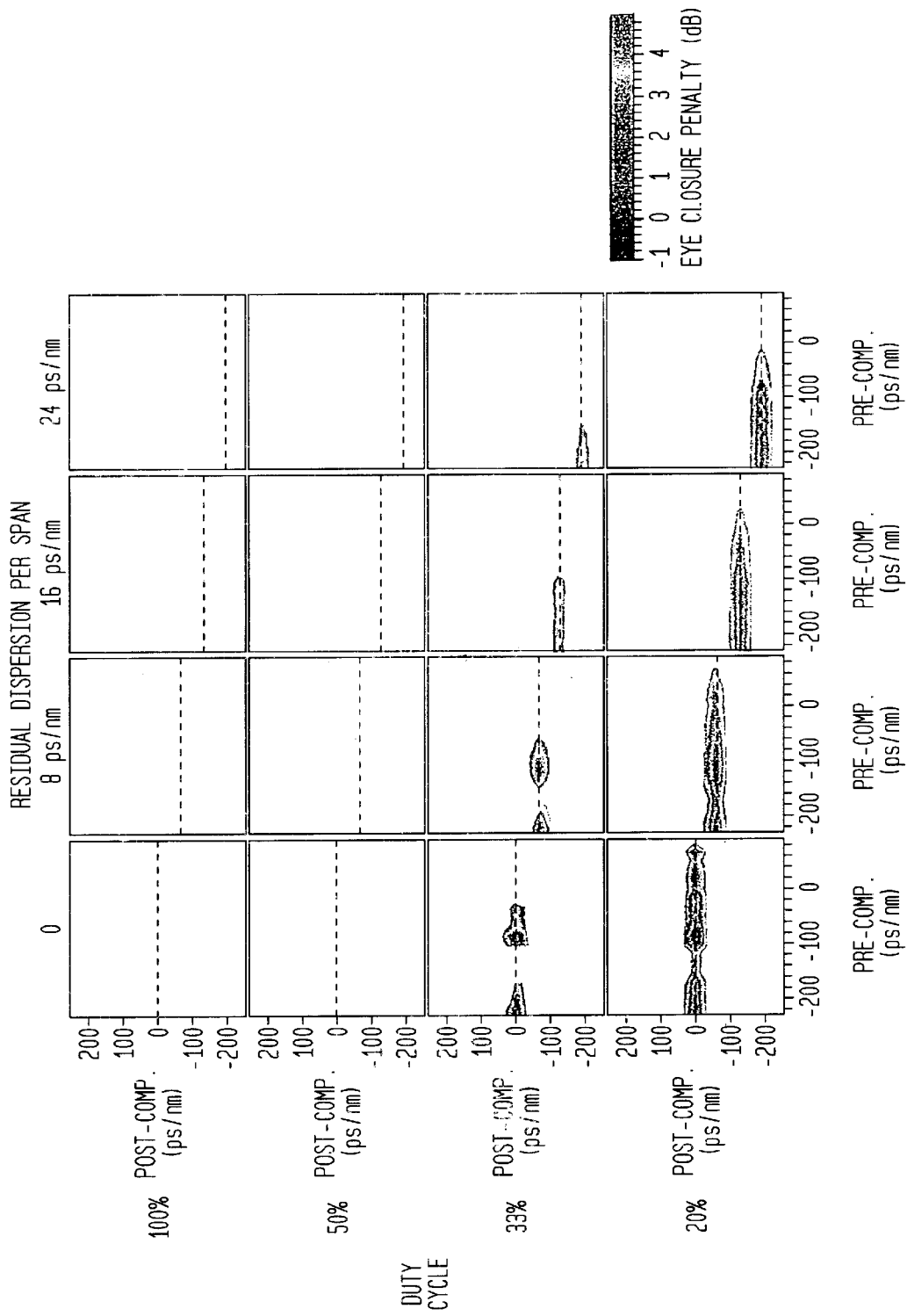
FIG. 7a is a graphical representation of the system performance for systems based on standard un-shifted fibers for 12 dBm of signal input average power.

FIG. 7a presents the performance of systems based on STD un-shifted fibers having a dispersion value of D=17 ps/(km nm). The performance pattern with respect to different duty cycle formats follows that which is expected from extrapolations of the results of FIGS. 4, 5, and 6. The only format giving acceptable performance for STD fibers is the RZ format with 20% duty cycle. It should be noted that STD fibers have a larger effective area than the others so that the effective non-linearity observed in STD fibers is about 1.6 dB lower than that for the other fibers shown in FIG. 3. This may explain why there is a wider range of allowed pre-compensation for STD fibers relative to what is expected from direct extrapolation of the results of FIGS. 4, 5, and 6. FIG. 7b shows the performance of systems based on STD un-shifted fibers having a dispersion value of D=17 ps/(km nm), a 20% duty cycle and varying residual dispersions per scan. Once again, it is seen that regardless of whether the residual dispersion per scan is over- or under-compensated, 100% cumulative dispersion compensation can be achieved by suitably adjusting the pre-compensation accordingly.

An important feature of a modulation format as herein disclosed relates to the power dependence of its optimal operation point. The importance of this feature results from the presence of gain ripples in optical amplifiers (of up to 1 dB peak to peak per amplifier) which leads to the creation and growth of power differences between channels. For example, in system of 8 spans of 80 km as considered herein, the power difference between the highest and lowest-power channels will reach 8 dB. If the point of optimum dispersion compensation is power dependent, then the level of complexity in optimizing a system with a range of powers increases dramatically. Simultaneous optimization of all of the channels of such a system would only be possible at very high equipment expense and through complex system design engineering.

Figure 8:
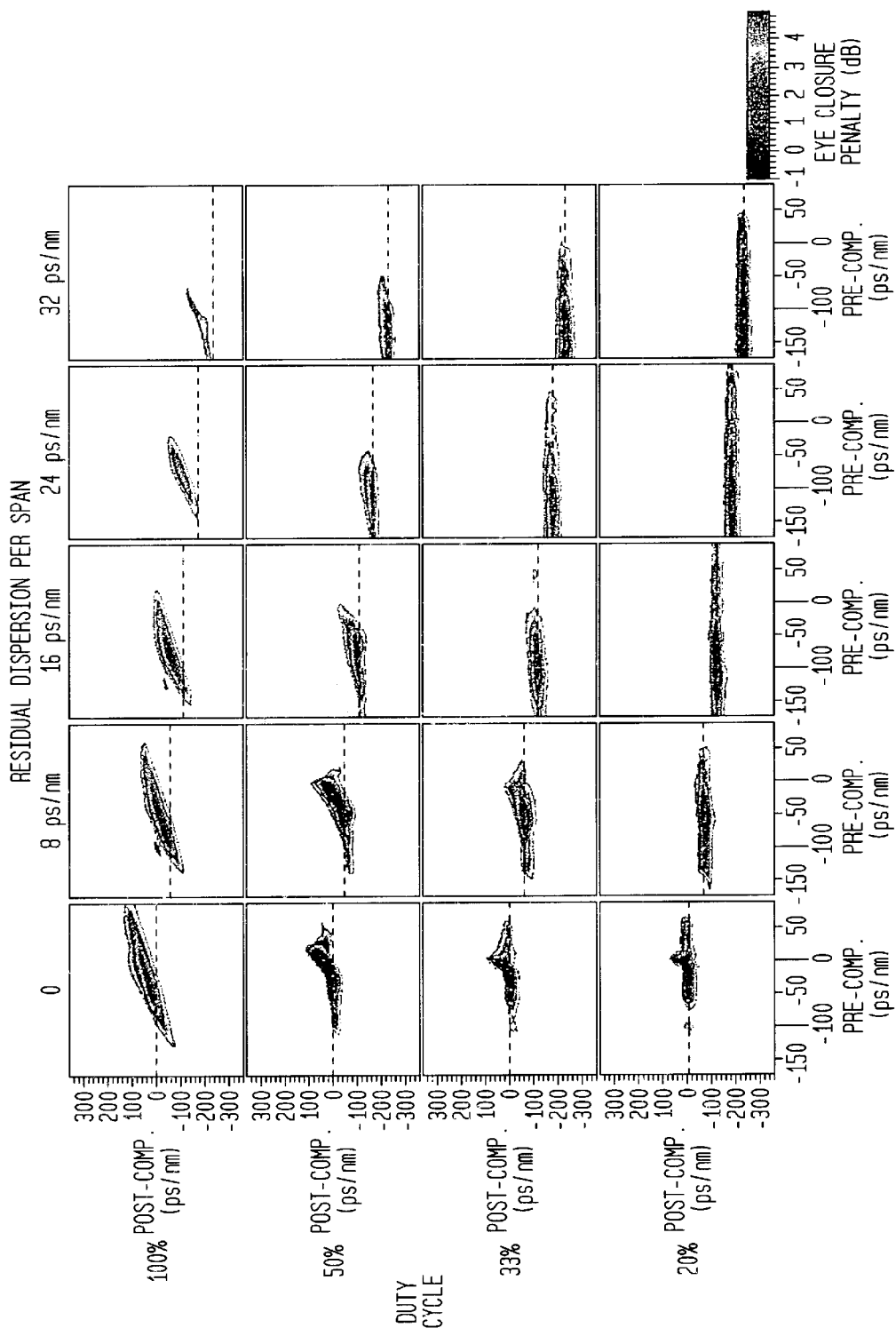
FIG. 8 is the same as FIG. 4 with 8 dBm of signal input average power.
Figure 9:
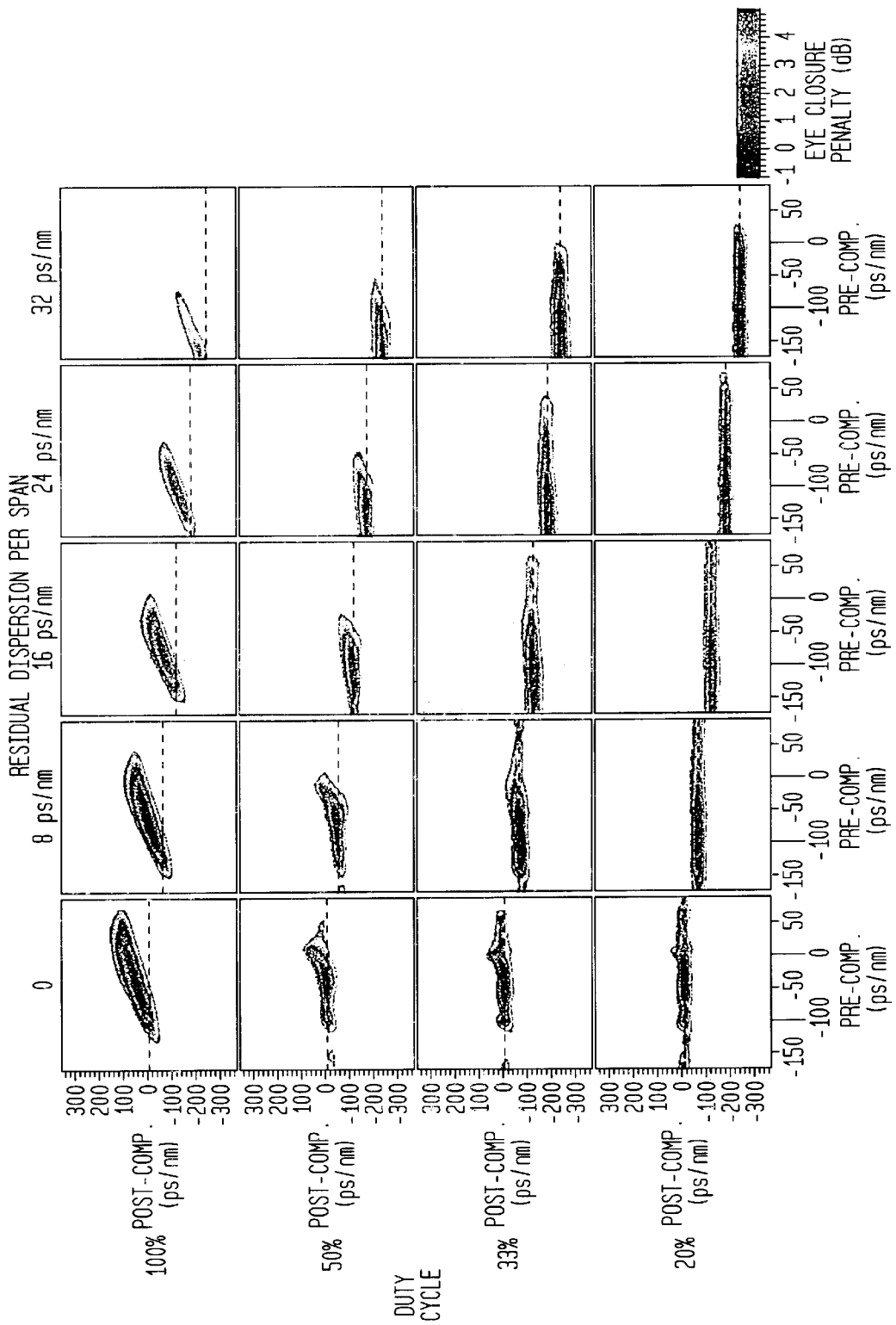
FIG. 9 is the same as FIG. 5 with 8 dBm of signal input-average power.

To explore the issue of power dependence, FIGS. 8 and 9 show the system performance for the same fiber characteristics considered in FIGS. 4 and 5 but for a reduced average signal power of 8 dBm. An additional column has been added in FIGS. 8 and 9 and the levels of pre-compensation are reduced as compared to FIGS. 4 and 5. It is clear from these figures that there is virtually no power dependence for formats having low duty cycles. For the NRZ format (i.e. 100% duty cycle), even though noticeable the power dependence of the point of optimum performance does not appear to be dramatic. However, if the power is reduced further, the optimal dispersion compensation for all formats should be 100% as the transmission simply becomes transmission in a linear regime. Interestingly, for a 50% duty cycle very different behaviors are observed for 8 and 12 dBm of power using fibers having 2 ps/(km nm) of dispersion. While optimal performance occurs for a system fully dispersion compensated at 8 dBm, under-compensation is necessary for 12 dBm of power. This point thus appears to represent a transition between nearly linear transmission and nonlinear transmission.

It should be noted that the apparent power independence for the optimal level of dispersion compensation for low duty cycle formats, along with its tolerance to the precise level of in-line dispersion compensation, will make the engineering rules for systems using formats with low duty cycle exceptionally simple. However, it must be recognized that full dispersion compensation over a wide band will be required for such systems and may be difficult to accomplish for transmission fibers with low dispersion [2 to 8 ps/(km nm)] as these fibers require shorter length DCFs with correspondingly reduced level of dispersion slope compensation.

Figure 10:
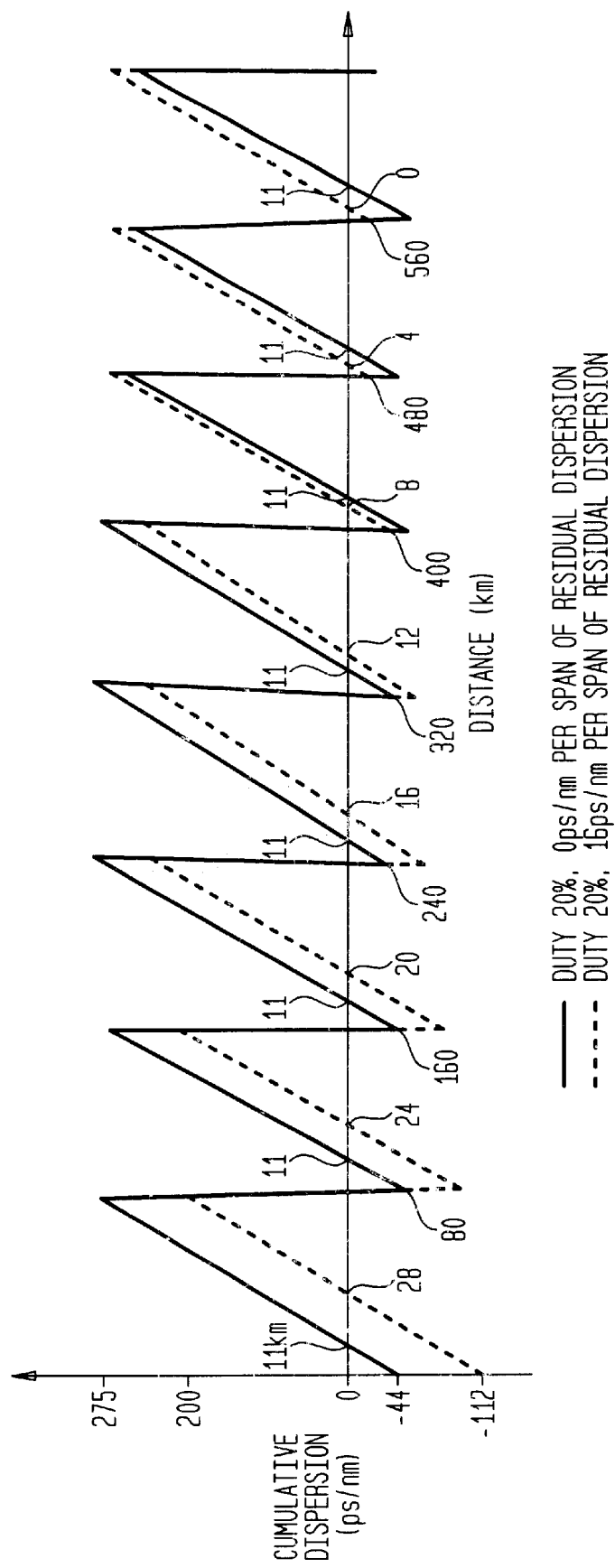
FIG. 10 is a dispersion map for the compensation diagram of FIGS. 4–9.

FIG. 10 presents a dispersion map for the results depicted in FIG. 5a. The dispersion map shows the result of an extrapolation of a distance interval at which the pre-compensation is based. The solid line in FIG. 10 represents a 20% duty cycle with 0 ps/nm residual dispersion per span, and the dotted line represents a 20% duty cycle with 16 ps/nm residual dispersion per span. As seen in FIGS. 5a and 10, the amount of pre-compensation required for transmission is approximately −44 ps/nm. This is the point at which the eye closure penalty is minimal for a 20% duty cycle and 0 ps/nm residual dispersion per span. Thus, on the dispersion map of FIG. 10, the average point of zero cumulative dispersion is 11 km in each span. As the distance of the span increases toward 80 km, the cumulative dispersion increases to 275 ps/nm. At the beginning of the next 80 km span, the cycle starts again. The zero crossings of the cumulative dispersion represent the distances at which 100% cumulative compensation is achieved. Thus, an average of all of the zero crossing distances for the spans represents the distance rating at which pre-compensation of the transmission is to be performed. In the example shown, the zero crossing for each 80 km span is at a point 11 km into the span; the average is accordingly 11 km. Therefore, for 100% in-line dispersion-compensated system using TrueWave™ fiber with a dispersion value of 4 ps/(km nm), the pre-compensation of the transmission is performed based on 11 km. In the other example presented in FIG. 10 (i.e. a 20% duty cycle with 16 ps/nm per span of residual dispersion), the zero crossings for the spans are at 28, 24, 20, 16, 12, 8, 4 and 0 km for the respective 8 spans of 80 km each—the average of these zero-crossing distances is 14 km. Therefore, for a 20% duty cycle with 16 ps/nm residual dispersion, the pre-compensation for the transmission is performed based on 14 km.

FIGS. 11–14 show the results of a test confirming the results achieved using the inventive modulation technique disclosed herein. Single channel RZ-format transmission of 100 Gb/s over 160 km of conventional SMF is demonstrated using reliable semiconductor components. Electroabsorption (EA) modulators are employed in both the transmitter and de-multiplexer and simple bit-rate independent opto-electronic clock recovery is demonstrated. For 100 Gb/s transmission, receiver sensitivity of −26.1 dBm is measured and no penalty for transmission is present. Additionally, a large, nearly 12 dB dynamic range of launch power into the 80 km SMF spans is obtained. Insofar as known, this is at this time the highest reported bit-rate single-channel transmission over standard terrestrial distances of conventional SMF. Furthermore, it is believed that this is the first time that a 100 Gb/s system has been successfully implemented as demonstrated using semiconductor sources and de-multiplexers combined with un-correlated multiplexing of the baseband channels.

Figure 11:
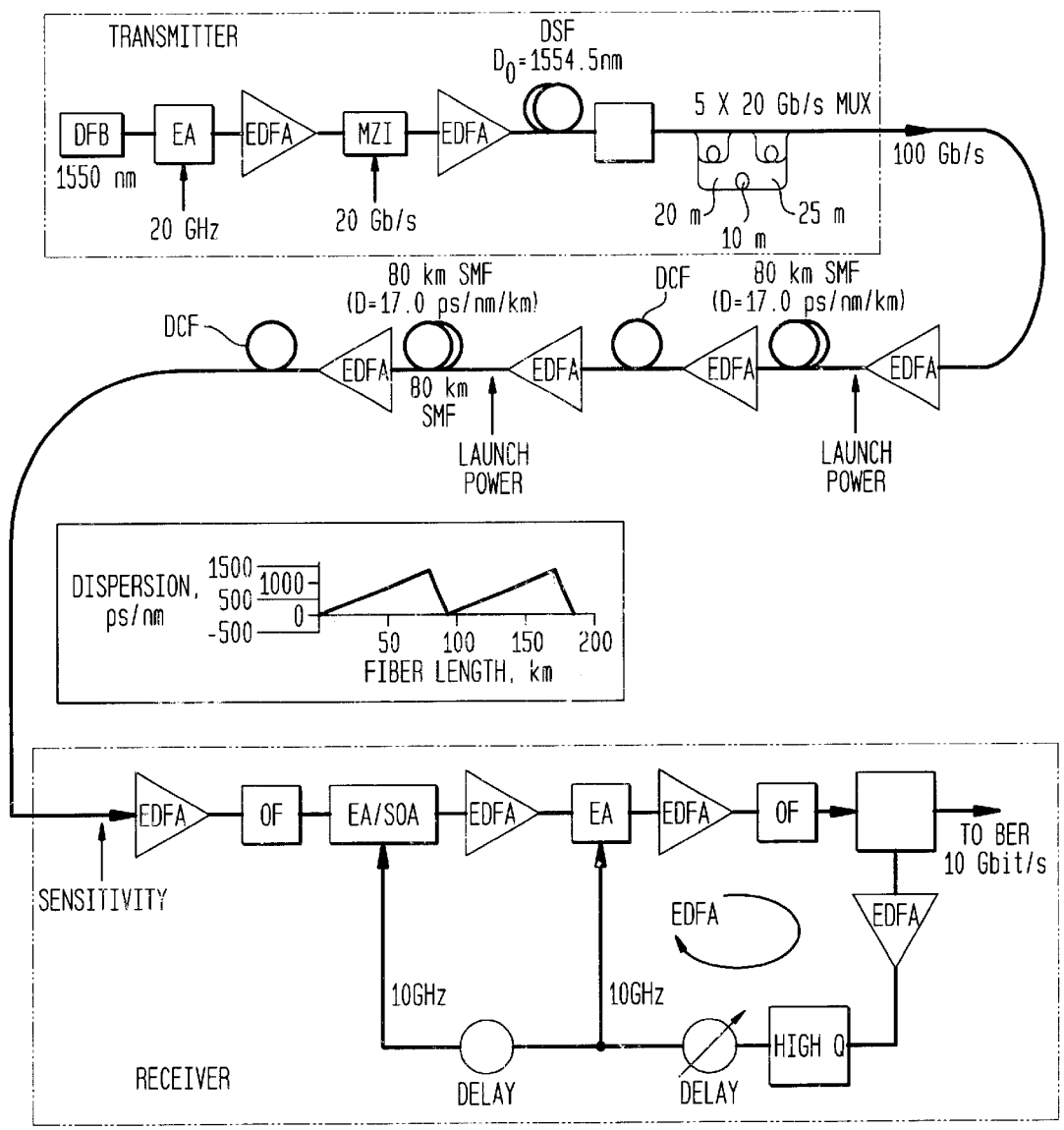
FIG. 11, is a schematic representation of an experimental set-up for 100 Gb/s RZ transmission over 160 km of SMF according to the invention.
Figure 12A:
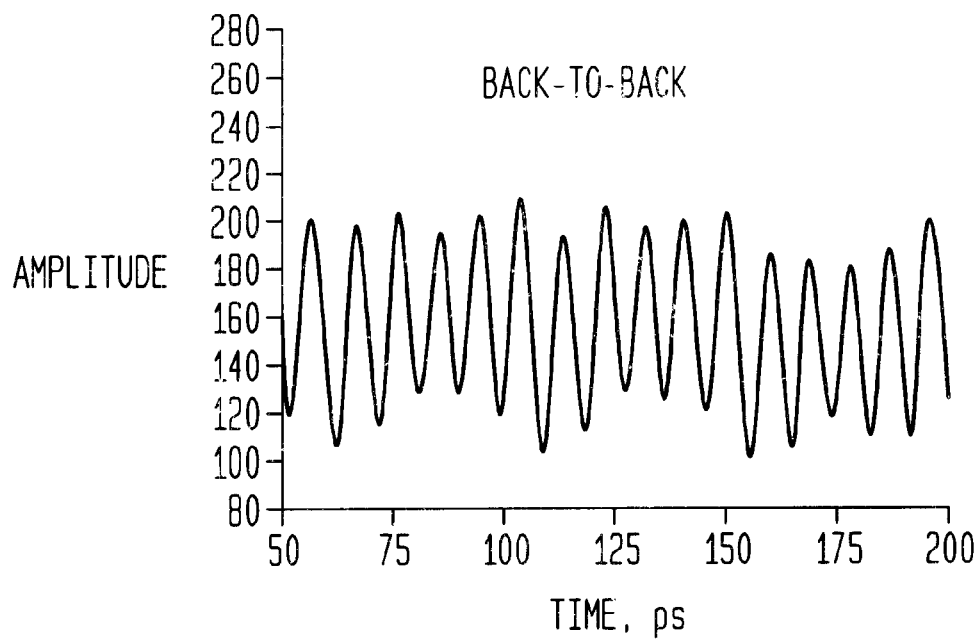
FIG. 12a is a graphical representation of 100 Gb/s pulse streams before transmission.
Figure 12B:
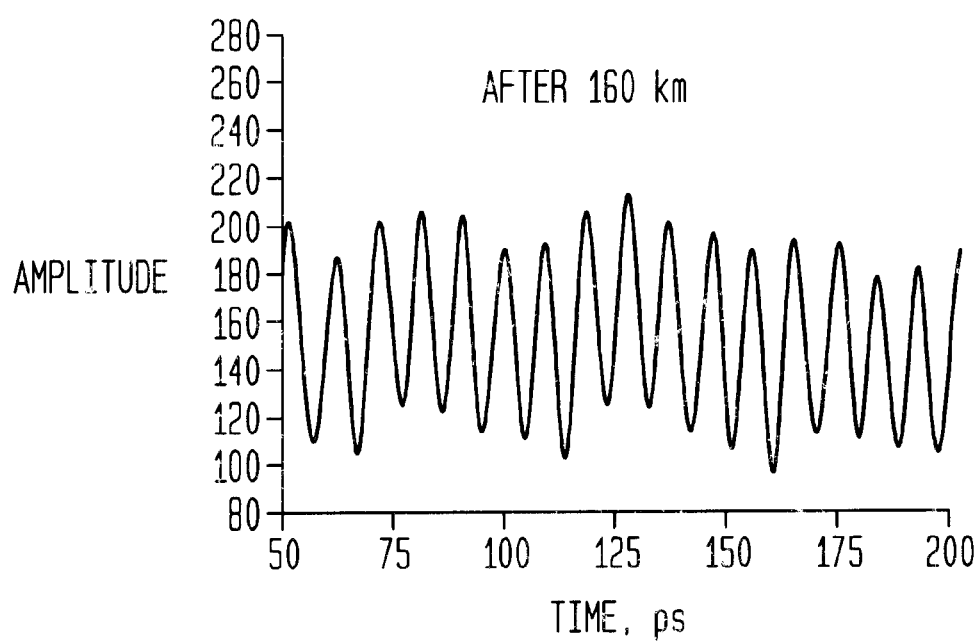
FIG. 12b is a graphical representation of 100 Gb/s pulse streams after transmission over 160 km.

To realize a 100 Gb/s RZ signal from 5 multiplexed 20 Gb/s signals, 3 ps pulses with more than 35 dB extinction are required. Previously, this requirement has been met using mode-locked erbium-doped fiber ring lasers and optical multiplexing and de-multiplexing which has been demonstrated at 640 Gb/s. However, previous transmission results have used optical fiber with zero dispersion near the transmission wavelength of 1550 nm. In accordance with an embodiment of the present invention, semiconductor electroabsorption modulators followed by an all-optical 2R regenerator are used to achieve the desired and required performance. The transmitter configuration is shown in FIG. 11. Short, 7 ps pulses are generated by sinusoidally driving a reverse biased EA modulator with a 10 V pp signal at a repetition rate of 20 GHz. Pseudorandom data with a word length of $2^{31}-1$ is encoded onto these pulses at 20 Gb/s using a Mach Zehnder (MZ) LiNbO$_3$ modulator. Before multiplexing, the pulses are compressed and the extinction ratio is improved using a self-phase modulation effect in 8 km of dispersion shifted fiber (DSF). Approximately 100 mW average power is launched into the DSF which has a zero dispersion at 1554.5 nm. The output is optically filtered using a 1 nm interference filter (OF) and the pulse is compressed to 3 ps as measured on a streak camera. The 20 Gb/s RZ signal is then passively multiplexed to 100 Gb/s using fiber delay-line multiplexers. The fiber lengths in the multiplexers are approximately 20 meters long, which delays one channel by nearly 2000 bits at 20 Gb/s.; this assures a reasonable decorrelation of adjacent channels. FIGS. 12a and 12b show the multiplexed 100 GHz pulse stream as measured on the streak camera before and after transmission over the 160 km of fiber. The resolution of the streak camera is approximately 4 ps, which is not sufficient to show the true extinction ratio of the bit stream.

The 100 Gbit/s signal is launched into two 80 km spans of conventional single-mode fiber (SMF) with a dispersion of 17.0 ps/(km nm) at 1550 nm and an average loss of 0.2 dB/km, as shown in FIG. 11. The dispersion is compensated after each span using dispersion compensating fiber (DCF) with dispersion of −90 ps/(km nm) and a dispersion slope of −0.2 ps/(km nm$^2$). The dispersion map for the system is shown as an inset in FIG. 11. Each span is practically 100% dispersion compensated, and therefore no pre-compensation is used. Erbium-doped amplifiers (EDFA) are used to compensate for losses in the spans and to control the launch power into each span. The launch power into the DCF is controlled near 0 dBm.

The receiver configuration is also shown in FIG. 11. Optical de-multiplexing and bit-rate independent clock recovery is achieved using EA modulators. Although the 100 Gb/s data is assembled using a baseband rate of 20 Gb/s, the de-multiplexer operates at 10 GHz to eliminate an additional electronic de-multiplexer necessary for bit-error-rate (BER) measurements. A switching window of 1 ps is obtained by driving the modulators sinusoidally at 10 GHz. Two EA modulators are concatenated to reduce the switching window sufficiently to de-multiplex the 100 Gb/s signal. Two types of EA modulators are employed in the illustrated system. The first stage has an integrated semiconductor optical amplifier (SOA), which follows the EA modulator and provides sufficient gain to eliminate the insertion loss of the EA modulator. An erbium doped fiber amplifier (EDFA) is inserted between EA stages to increase the power through the second EA modulator which does not have an integrated SOA and, as result, has an insertion loss is 11 dB. The signal is then detected for BER measurements. Clock recovery is achieved by using an injection locked electro-optic oscillator using the EA modulator, a high gain loop and a high Q filter as shown in FIG. 11. The loop oscillates at the baseband (10 GHz) frequency since this is where the gain is highest as forced by the high Q filter. The system is started by the noise inside the loop, generated primarily by the EDFA which has high gain and high output noise in the unsaturated state. Once the loop is locked, the EDFA is saturated and the phase of the clock can be varied to select different baseband channels.

Figure 13:
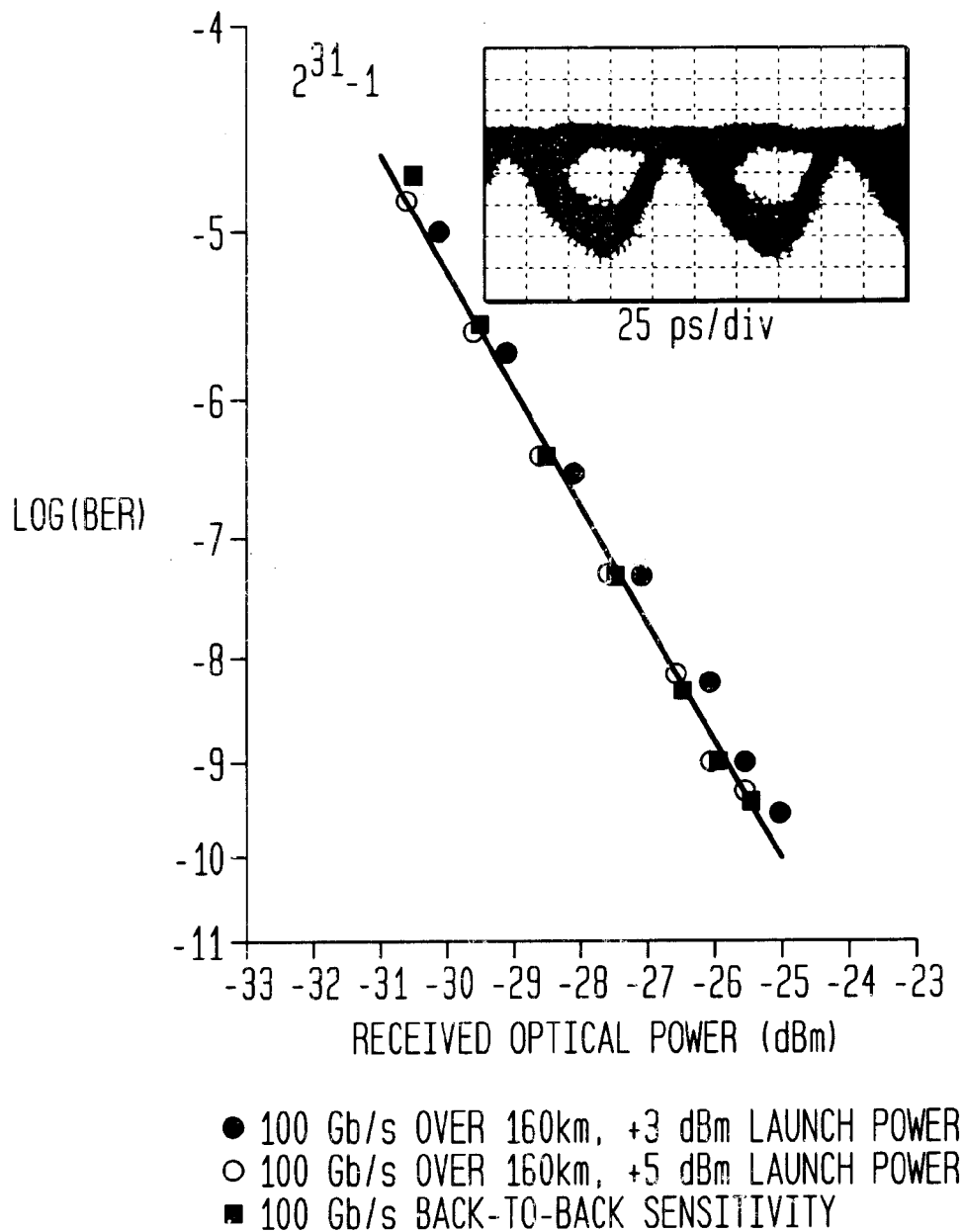
FIG. 13 is a graphical representation of the BER measurement for 100 Gb/s transmission over 160 km of SMF according to the modulation technique of the present invention.

The measured BER performance of this arrangement is shown in FIG. 13. The solid squares depict BER performance for the back-to-back system. The receiver sensitivity measured at the input to the optically pre-amplified receiver is −26.1 dBm. The BER is shown for the 160 km transmission for +3 dBm and +5 dBm launch power. Clearly, a negligible penalty is observed. Changing the phase of the clock signal to the de-multiplexer allows the other channels to be de-multiplexed and similar receiver sensitivity is observed.

Figure 14:
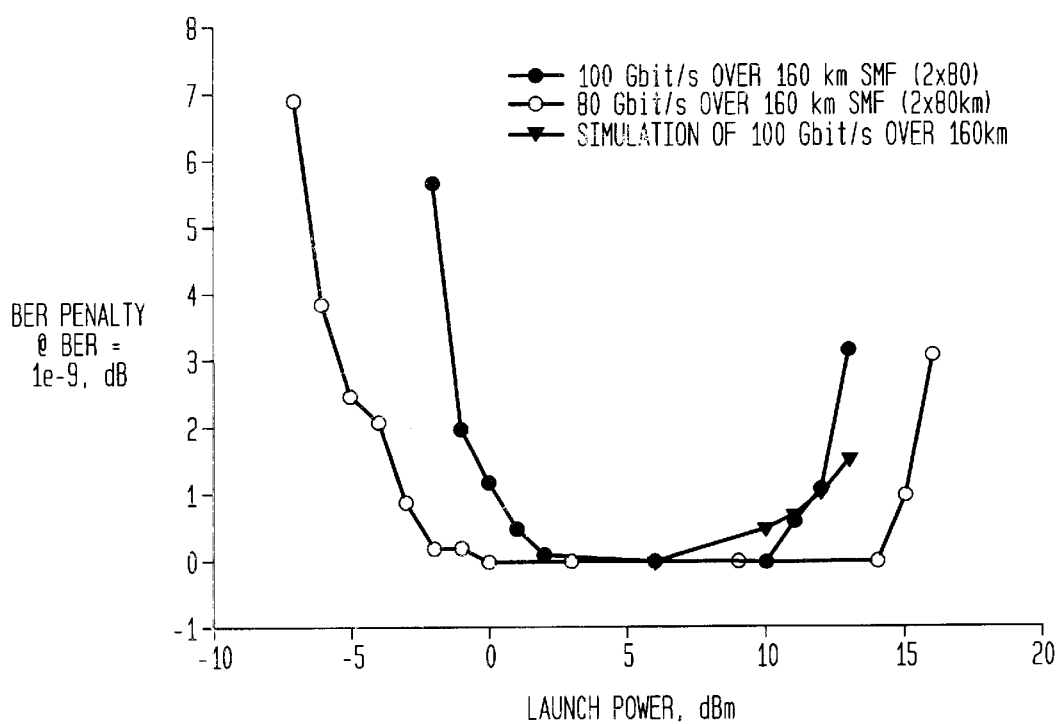
FIG. 14 is a graphical representation of the BER penalty as a function of launched optical power into each span of SMF according to the modulation technique of the present invention.

FIG. 14 shows the effect of varying the launch power into the SMF spans. The BER penalty at BER=1E-9 is plotted on the vertical axis. The penalty for an 80 Gb/s system is also shown. A dynamic range of 0 to +12 dBm is observed for a penalty of less than 1 dB.

At the low power end, the BER penalty grows rapidly due to low signal to noise ratio while, at the high power end, the signal degrades rapidly due to fiber non-linearities. Results from numeric simulations at 100 Gb/s are also shown in FIG. 14. These simulations were performed using a symmetric split-step algorithm with a PRBS of $2^6$ bits (i.e. 64 bits). Only the high power penalty is calculated and it agrees well with the experimental results.

The inventive modulation technique disclosed herein yields the highest single-channel bit-rate RZ transmission over terrestrial distance, conventional single mode fiber, that has heretofore been achieved. At 100 Gb/s, no penalty is observed over nearly a 12 dB variation in span launch power. This result is achieved using uncorrelated multiplexing and telecommunications reliable semiconductor components in both the pulse source and demultiplexer.

Thus, while there have shown and described and pointed out fundamental novel features of the invention as applied to a preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

We claim:

1. In a method for modulating fiber optic transmissions with low sensitivity to fiber non-linearity in fiber optic systems having a fiber optic transmission line, said method comprising the steps of:

pre-dispersion compensating of transmission information;

transmitting optic signals containing pre-dispersion compensated transmission information through the transmission line at a bit rate of at least 10 Gbs in short pulses having a broad spectral bandwidth, said short pulses having a range of 0.004 ps to 20 ps; and post-dispersion compensating of the transmitted transmission information.

2. In a method for modulating fiber optic transmissions with low sensitivity to fiber non-linearity in fiber optic systems having a fiber optic transmission line, said method comprising the steps of:

pre-dispersion compensating of transmission information;

transmitting optic signals containing the pre-dispersion compensated transmission information through the transmission line at a bit rate of at least 10 Gbs in short pulses having a broad spectral bandwidth, said short pulses having a range of 0.004 ps to 20 ps; and post-dispersion compensating of the transmitted transmission information to obtain 100% cumulative compensation at a downstream end of the transmission line.

3. In the method set forth in claim 2, wherein said step of pre-dispersion compensating is performed based on an average position of a point of zero cumulative dispersion in the transmission line.

4. In the method set forth in claim 3, wherein said step of transmitting is performed at a bit rate of 40 Gbs, and wherein the average position of the point of zero cumulative dispersion is within a range of 0–20 km from an upstream end of the transmission line.

5. A method for modulating fiber optic transmissions having transmission information with low sensitivity to fiber non-linearity in fiber optic systems having a fiber optic transmission line, comprising the steps of:

pre-dispersion compensating of the transmission information;

transmitting optic signals representing the precompensated transmission information in short pulses having a range of 0.004 ps to 20 ps and at a bit rate of at least 10 Gbs; and post-dispersion compensating of the transmitted transmission information to obtain 100% cumulative compensation at an end of the transmission line.

6. The method set forth in claim 5, wherein said step of pre-dispersion compensating is performed based on an average position of a point of zero cumulative dispersion in the transmission line.

7. The method set forth in claim 5, wherein said step of transmitting is performed at a bit rate of 40 Gbs, and wherein the average position of the point of zero cumulative dispersion is within a range of 0–20 km from an upstream end of the transmission fiber.

* * * * *